May 10, 1938. J. G. FEMINELLA 2,117,086
DENTAL FLASK
Filed Nov. 27, 1936
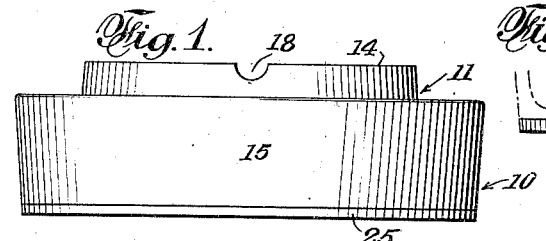
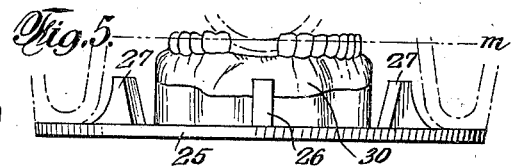
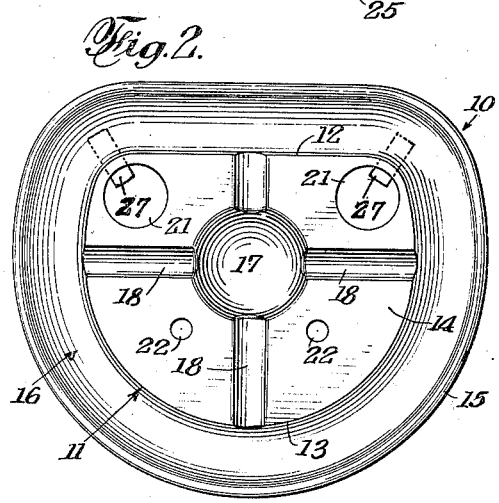
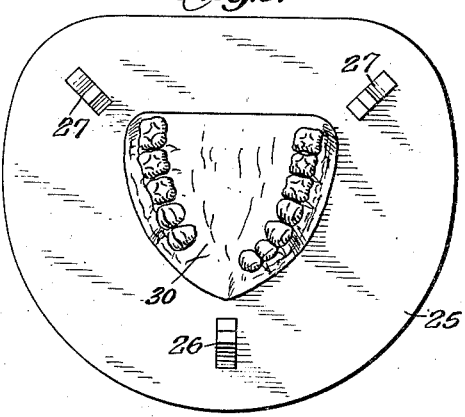
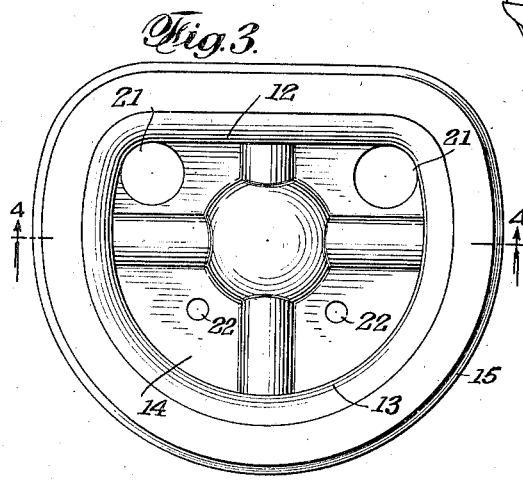
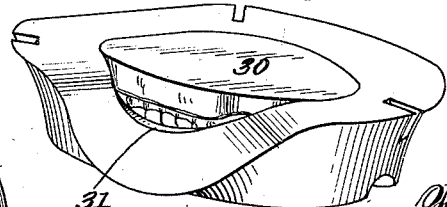
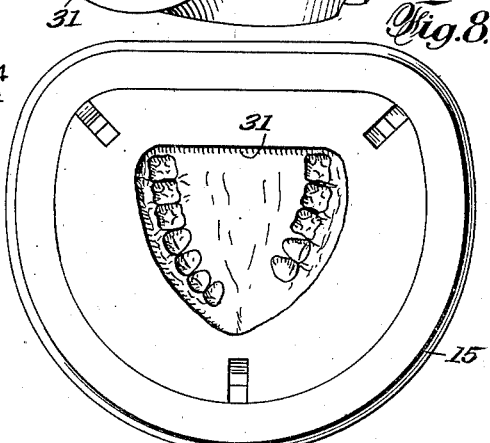
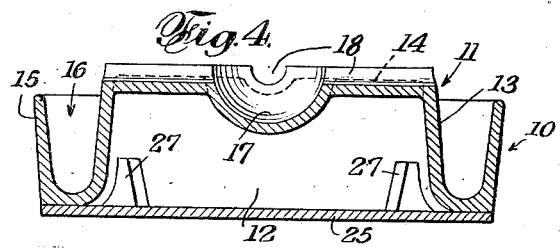
INVENTOR
JOHN G. FEMINELLA
BY
ATTORNEYS Patented May 10, 1938

2,117,086

UNITED STATES PATENT OFFICE 2,117,086

DENTAL FLASK

John G. Feminella, Brooklyn, N. Y.

Application November 27, 1936, Serial No. 113,017

1 Claim. (Cl. 18—33)

This invention relates to dental flasks for use primarily in manufacturing the mold employed in the construction of working models employed by dentists in orthodontia, prosthetics and in crown and bridge work.

In these three branches of the science of dentistry it is customary to proceed with the following general technique: An impression in plaster of Paris is taken of a portion of the mouth which includes that area of the gum and teeth in the case of orthodontia embracing the teeth the occlusion of which is to be corrected, in the case of prosthetics the gum and space which is to receive the partial dentures, and in the case of crown and bridge work the teeth which are to be crowned or those which are to support the bridge. Ordinarily the impression embraces the entire dental arch.

The plaster of Paris impression after shellacking is used as a mold for the construction of a pattern or model of hard durable material, commonly referred to in the dental profession as "stone", which in a fluid condition is poured into the plaster of Paris cast where it hardens. The "stone" model is in turn employed in the making of a mold used in forming or casting the working models with which the dentist or laboratory man works in connection with the correction of malocclusion, restorations, or crown and bridge work, as the case may be.

The mold made from the "stone" model is flexible but of sufficient rigidity to maintain its shape while in use in the making of working models. It is commonly made of a preparation known as "denticol" which in a hot fluid condition is poured into a container about the "stone" model and hardens to a consistency somewhat analogous to rubber,—the rubber of an automobile tire shoe or a solid rubber ball. To obtain a satisfactory impression in the mold of the "stone" model, water cooling is employed and the technique is quite difficult.

When the mold has been finally and properly prepared the working models employed by dentists in orthodontia, prosthetics, and crown and bridge work are made by pouring into the mold a suitable substance which on solidifying has great hardness, density and resistance to heat, such substances, for example, as crystobalite or cocal. These in fluid condition are poured into the mold at one side so that they run the length of the mold, filling it completely and exactly without any air bubbles or air holes. Vibration of the mold is employed in this part of the technique. When the substance of the working model thus poured is hardened, it is removed or ejected from the mold by bending the mold backwardly away from the casting. The mold is not at all damaged by this casting and may be repeatedly employed in the formation of as many working models as are desired.

It is with the manufacture of the mold employed in making the working models that this invention is concerned. One object of the invention is a flask onto which the liquid mold forming material may be poured about the "stone" model which provides for progressive water cooling of the mold in a manner most advantageous for the formation of a perfect mold.

Another object of the invention is a flask of the character above set forth which after the mold has been formed may be used as a container for the mold in employing the mold in the casting of the working models, and through which vibrations may be readily transmitted to the material being cast so as to aid in the proper flow of the material to avoid air bubbles and holes in the cast working model.

Another object of the invention is a flask of the character above set forth which by its form and proportions forms a mold with the minimum amount of mold forming material requisite for the forming of perfect working models.

Another object of the invention is a flask of the character above set forth the use of which tends to simplify and improve the technique of making both the mold and the working models.

Further objects of the invention will appear as this description proceeds.

In the drawing which forms a part of this application I have disclosed a satisfactory form and type of flask for purposes of illustration, but without intending to limit the invention to the precise form and type shown. The flask shown is a one piece flask to be employed in connection with a bottom board upon which the flask stands in close contact.

In the drawing, Figure 1 is a front elevation of the flask and bottom board in position for pouring the mold;

Fig. 2 is a plan view of the flask and bottom board assembled as in Fig. 1;

Fig. 3 is an inverted plan of the flask;

Fig. 4 is a vertical section of the flask and bottom board on the line 4—4 of Fig. 3;

Fig. 5 is a front elevation of the bottom board with an illustrative "stone" model properly placed thereon preparatory to pouring the mold, a portion of the flask being indicated by dotted lines;

Fig. 6 is a plan of the bottom board and "stone" model of Fig. 5;

Fig. 7 is a prospective of the mold bent backwardly for removing either the "stone" pattern or model or the working model when cast; and Fig. 8 is an inverted plan of the flask with the mold therein ready to receive the liquid material used in casting the working model.

The shape of the flask illustrated is particularly adapted for use in making a mold from a "stone" model of a complete dental arch. It can be used as well where only portions of the complete arch are employed in the "stone" model so that in this respect the shape is one adapted for universal employment. The functional features of the flask, however, may be embodied in flasks of different shapes where "stone" models of only portions of the arch are employed. I have reference more particularly to the portions of the flask which provide for and control the water cooling of the mold, as will be appreciated from the description of the flask illustrated and of the operation thereof now to follow.

The flask 10 has an inner hollow casing 11 which in horizontal section conforms in general with but is somewhat larger than the outline of the "stone" model of a complete dental arch. The back wall 12 of the casing is substantially straight and with forwardly bending curves at each end joins the semicircular forward wall 13 of the casing. These walls 12 and 13 are rounded outwardly at the bottom from which they arise at a slight angle inwardly from the vertical so that the pattern when formed may be readily ejected from the mold and so that the flask itself may be cast without coring and its pattern have sufficient draft for ready green sand molding. The front and rear walls of the casing merge into the top 14 of the casing as a unitary structure, the top being parallel with the open bottom of the casing.

The casing 11 is surrounded from the bottom nearly to the top by an outer wall 15 cast integrally with the casing which forms a water cooling trough 16 completely encircling the casing at the outside. This outer encircling wall 15 extends upwardly at a slight angle outward from the vertical throughout to afford the necessary draft for green sand molding without the use of cores above referred to. The junction of the outer wall 15 and the walls 12 and 13 of the casing below is flat and lies in a plane, forming a gravity seal with the bottom board heretofore referred to when mounted in position thereon.

The top of the casing 14 is formed with a water cooling reservoir 17 which extends downwardly from the top a distance most advantageous for cooling purposes. In the form of flask for universal use illustrated this reservoir is of semispherical contour and extends downwardly to a point which on the average would lie about even with the upper line of the "stone" pattern or model when placed on the bottom board for use in making the mold. See Fig. 5 wherein the dotted line $m$ indicates the line of the lower surface of the reservoir 17 and its cross channels 18. The reservoir is placed slightly rearward from the middle of the top 14, this being its most advantageous position for use with a "stone" pattern or model of a complete dental arch.

The cross channels 18 constitute overflow leads from the reservoir 17 to the trough 16 and are comparatively shallow. They are advantageous in directing the overflow from the reservoir to the trough. Where four as illustrated are employed these channels extend outwardly from the reservoir in cruciform relation. They may conveniently be semicircular in vertical section and may bear a slight inclination from the upper edge of the reservoir or extend horizontally therefrom as is shown in the drawing. The number of channels employed is optional. I have obtained excellent results with the four channels illustrated.

Referring to the interior of the mold, it will be noted (see Figs. 3 and 4) that the top of the mold is divided into a series of sections by the depending reservoir 17 and channels 18, so that without vents these would constitute gas or air pockets on pouring the mold forming material. Vents are, therefore, provided in each of these sections, those at the back of the mold 21—21 being preferably sufficiently large to permit of the insertion of the fingers for ejecting the mold when formed, one of them being employed as a pour hole, and those at the front of the mold 22—22 being preferably, though not necessarily, much smaller and employed only as vents. In actual practice the larger vents 21—21 may be cast and subsequently reamed for smoothness, but the vents 22—22 when small are preferably drilled.

It should be understood that the inclination of the walls 12, 13 and 15 from the vertical is not functional (except as to the interior of the mold casing) but is a matter of convenience and of economy in the manufacture of the mold itself in green sand molding, as will be readily understood by those skilled in the art of casting metals. The same applies as to the particular contour on the top of the casing of the reservoir 17 and the channels 18. The complete inner surface of the casing 12 should be smooth and without any undercuts so that the mold when formed may be readily removed from the flask.

The bottom board 25 is merely a plate having a flat smooth top conveniently of the same contour at its border as the bottom of the trough wall 15. Guides are provided to aid in setting the flask in proper and uniform position on the bottom board. Where those guides are mounted for cooperation with the inside of the mold, they may conveniently take the form of lugs, one 26 in the front and two 27—27 in the rear. These lugs have their outside edges made to conform substantially with the curve of the inside of the flask at the bottom with which they loosely contact in proper positioning of the flask on the bottom board.

The lugs 26, 27, furthermore, serve as guides for placing the "stone" pattern or model in proper position on the bottom board for pouring the mold forming material. To this end they may be located one each in the corners of an isosceles triangle. Note the positioning of the "stone" model 30 in Fig. 6.

Where the bottom board is to be cast the lugs 26, 27 may be cast integrally therewith and for this purpose are so formed as to have sufficient draft for casting without a core. Furthermore, however made they should have sufficient taper to permit ready removal of the mold when formed without adhering thereto.

Both the flask and the bottom board should preferably be of metal which has high thermal conductivity to assist in a rapid cooling of the mold when poured. While not essential that the metal of the flask and the metal of the bottom board be the same, it is convenient to cast both the flask and the bottom board of aluminum, preferably substantially pure. Aluminum for this purpose may be cast very thin and still have sufficient rigidity to withstand usage. Its thinness contributes to a rapid dissemination of heat in cooling the mold after pouring.

A comparison of the size of the flask illustrated with that of the "stone" model 30 affords an understanding of a size of flask for universal use, which is satisfactory. The size of the flask shown, however, is intended to be illustrative and not limitative. Where this size is employed a large saving of mold forming material is affected over that now commonly used, and a very efficient and satisfactory mold is produced.

In forming the mold the "stone" pattern or model 30 is placed on the bottom board in such position that the reservoir 17 is most advantageously located for cooling. Thus, with a complete dental arch such as illustrated, the center point of the arch in front is placed directly behind the guiding lug 26 with the two back points of the arch substantially in line with the rearward guiding lugs 27—27, each of the three points being substantially an equal distance from the three lugs. The teeth on the "stone" model point upwardly. The flask is then placed over the model so that it rests on the bottom board as illustrated in Figs. 1 and 2, with the bottom of the flask forming a gravity seal with the bottom board. The hot liquid mold forming material is then poured into one of the pour holes 21 until the complete interior of the flask is filled. This may readily be determined by watching the upper surface of the poured material through the large pour hole 21 not employed for pouring. When the liquid mold forming material strikes the bottom board and runs to the outer lower edges of the mold it ordinarily will be sufficiently chilled and its fluidity lessened to such an extent that it will flow out at the junction of the mold with the bottom board to an inconsequential extent, if at all. Should the mold forming material employed be found to require a more substantial seal between the flask and the bottom board than that provided by gravity, suitable clamps either permanently attached to the mold or bottom board or separate therefrom may be employed as will readily be understood by those skilled in the art of molding.

As soon as the flask has been filled with the hot liquid mold forming material as above set forth, the pouring of that material is discontinued and immediately cold water is poured into the reservoir 17 rather slowly. This pouring of the water into the reservoir at a slow rate is continued until the reservoir is filled and overflows through the channels 18 into the trough 17, filling the trough to the top of the trough walls 15. Ordinarily when the trough is filled with water the pouring of the cold water into the reservoir 17 may be discontinued. This, of course, depends on the mold forming material employed and the trough itself may be flooded from the overflow from the reservoir if necessary.

Upon complete cooling and solidification of the mold, the flask is lifted from the bottom board and the mold ejected from the flask by pressure through the pour holes 21; the mold is then bent backwardly as shown in Fig. 7 and the "stone" pattern removed. Upon releasing the backward pressure on the mold after removal of the "stone" pattern, the mold resumes its normal contour having a perfect impression 31 for use in casting the working models.

The chilling of the mold when formed as above stated is such that after "skin" cooling by contact with the metal major solidification first takes place on the upper part of the "stone" model about the essential portions thereof. This solidification at the center and top is followed by solidification at the sides of the mold with the fluid condition of the mold forming material between these solidified portions gradually diminishing until solidification is complete. This progressive solidification in the order named is of great importance in forming a mold about the "stone" model which completely fills all of the indentations and undercut portions of the "stone" model and is without distortion in all essential parts when finished. The central location of the reservoir and the outward location of the trough cooperate in securing this result. The high thermal conductivity of the metal or metals forming the flask and the bottom board is also a contributing factor to this result, so that it may properly be said that the reservoir, trough and metal of the flask and bottom board cooperate in the formation of a perfect mold.

For casting the working models the mold is replaced in the flask with the flask inverted as illustrated in Fig. 8, the depressed portions of the reservoir 17 and channels 18 aiding in firmly fixing the position of the mold in the flask. The material selected for forming the working model is then poured into the impression 31 with great care at one side of the impression, slowly flowing into the impression until the impression is completely filled and no air bubbles or air holes formed. During the pouring of the working model forming material into the mold and during the first part of the solidification thereof, a vibrator is placed against the edge of the flask which as the mold is firmly held therein transmits the vibrations to the impression 31 and the model forming material, greatly aiding in the prevention of air bubbles and air holes in the working model being cast. After the working model has been cast and solidified, it is removed from the mold in like manner as the "stone" model illustrated in Fig. 7, and the mold is kept for future production of additional working models where desired, precautions being taken to prevent the deterioration or deformation of the mold as will readily be understood by those skilled in the science of dentistry.

The foregoing description and illustrations have been given for clearness of understanding and no undue limitations should be deduced therefrom, but the appended claims should be construed as broadly as permissible in view of the prior art.

Having thus described my invention, what I claim is:

A flask suitable for use in the manufacture of molds to be employed in the practice of dentistry, comprising a casing open at the bottom and formed with upwardly extending walls and a top, the inner surface and conformation of the walls and top being such as to permit of ready removal from the flask of the mold when formed and the outer surface of the side walls being without drainage channels, an outer wall connected with the casing at the bottom but spaced apart from the casing walls and forming with the casing walls a trough surrounding the casing at the sides, the top of the casing being formed with a depressed reservoir, said trough and reservoir being adapted for use in water cooling the mold during its formation in the flask.

JOHN G. FEMINELLA.